Figure 1:
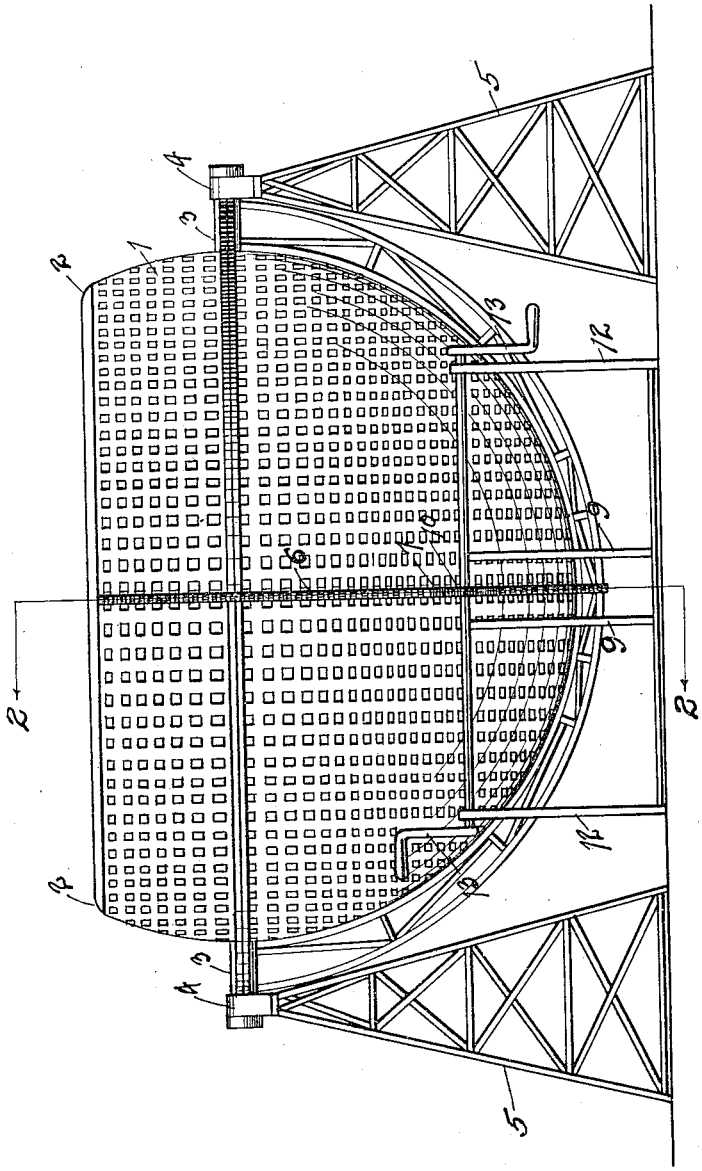

O. E. ADKINS.
AMUSEMENT DEVICE.
APPLICATION FILED FEB. 13, 1915.

1,142,387.

Patented June 8, 1915.
2 SHEETS—SHEET 1.

Witnesses
J. C. Merkle
A. L. Phelps

Inventor
Oscar E. Adkins

By
C. C. Shepherd
Attorney

O. E. ADKINS.
AMUSEMENT DEVICE.
APPLICATION FILED FEB. 13, 1915.
1,142,387.
Patented June 8, 1915.
2 SHEETS—SHEET 2.
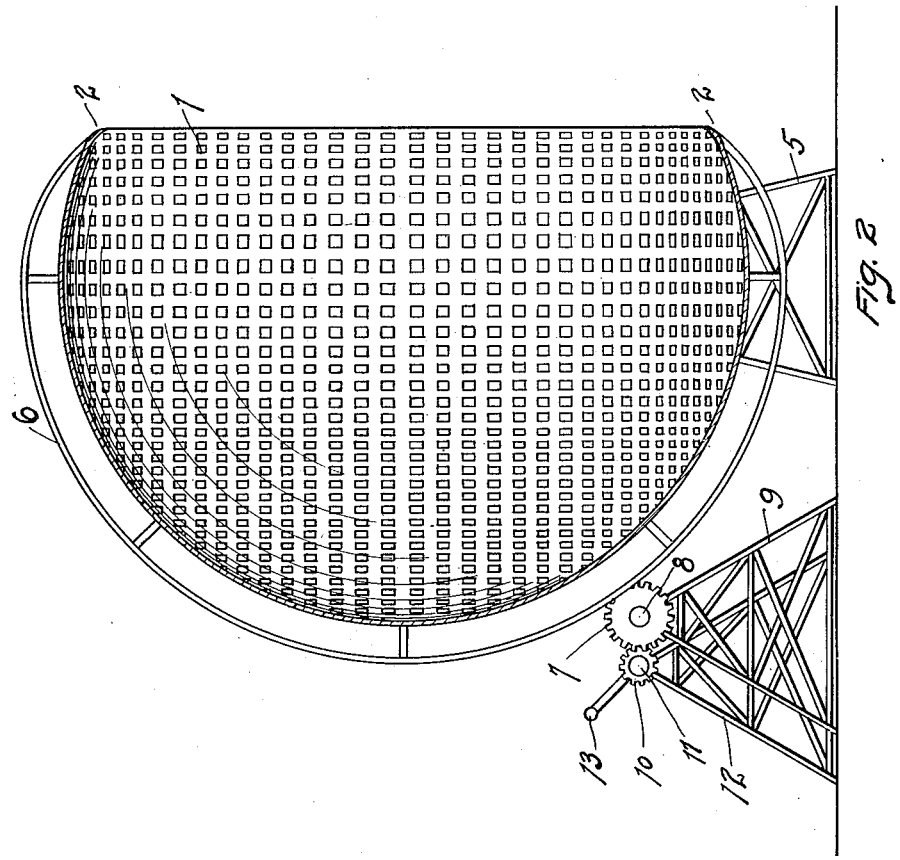

UNITED STATES PATENT OFFICE.

OSCAR E. ADKINS, OF COLUMBUS, OHIO, ASSIGNOR TO JOHN W. WOLFE, OF MONONGAH, WEST VIRGINIA, AND JOHN KELLY, OF COLUMBUS, OHIO.

AMUSEMENT DEVICE.

1,142,387.  Specification of Letters Patent.  Patented June 8, 1915.

Application filed February 13, 1915. Serial No. 8,085.

*To all whom it may concern:*

Be it known that I, OSCAR E. ADKINS, a citizen of the United States, residing at Columbus, in the county of Franklin and State of Ohio, have invented certain new and useful Improvements in Amusement Devices, of which the following is a specification.

My invention relates to amusement devices of the type wherein it is intended that a person shall exhibit his skill as a rider, especially of a bicycle or motorcycle. In other words, my device is intended for use in theaters or other public places.

The main object of my invention resides in the provision of a track member, upon which a rider is adapted to move at a high rate of speed, this track member being so mounted that it may be swung through an arc of ninety degrees, thereby permitting the rider to start out by traveling in a horizontal circular path to be subsequently moved to a position to travel in a vertical circular path.

A further object of my invention resides in constructing this track member of substantially semi-spherical shape to render more difficult the starting of the riding action.

The preferred embodiment of my invention is shown in the accompanying sheets of drawings, in which similar characters of reference designate corresponding parts, and in which:

Figure 1 is a view in side elevation of my device, and, Fig. 2 is a section taken on line 2—2 of Fig. 1, but showing the track member in a position at right angles from that shown in Fig. 1.

In carrying out my invention, I have provided a substantially semi-spherical track member 1, this track member being suitably constructed and flaring inwardly to a slight degree at its mouth portion, as is shown at 2. At diametrically opposite points, as shown at 3, this track member is provided with suitable stub shafts, which latter are rotatably journaled in bearings 4 located on the upper end of suitable supporting standards 5. It will be noted that both the track member and the supporting standards are suitably braced and are preferably constructed of sheet metal straps, although the specific construction is not essential to the carrying out of my invention. This track member is also provided with a substantially semi-circular rack member 6, the teeth of which are designed to coöperate with the teeth on the operating gear 7 supported on a shaft 8, this latter being also rotatably journaled in suitable supporting standards 9. The gear 7 also meshes with a pinion 10, this latter being mounted on a shaft 11 supported on the standards 12. This shaft is provided at each extremity with a hand crank, as shown at 13 by means of which the track member, as a whole, is moved through an arc of approximately ninety degrees.

The operation of my device is as follows: The track member is moved to assume the position shown in Fig. 1 and the rider upon any suitable wheeled vehicle, such as a motorcycle, begins to travel in a circular path. As his momentum increases, it naturally enables him to travel higher upon the circular side walls of the bowl and it is at this point that the hand cranks 13 are operated, whereby it is possible, through the connection between the gear 7 and rack 6, to move the bowl through an arc of ninety degrees or, as is shown in Fig. 2. At this time, the rider is traveling in a vertical circular path. After the time for the performance has elapsed, the bowl or track member may again be swung to the position as shown in Fig. 1, where it will be an easy matter for the rider to come to a stand still.

What I claim, is:

1. An amusement device comprising a semi-spherical track member, supporting standards, and means for pivotally mounting said track member at directly opposite points to said standards, said pivotal mounting being immovable as regards up and down movement.

2. An amusement device comprising a semi-spherical track member, supporting standards, means for pivotally mounting said track member at directly opposite points to said standards at an elevation to clear the floor in all positions, said pivotal mounting being immovable as regards up and down movement, and means whereby said track member may be moved through approximately ninety degrees.

3. An amusement device comprising a semi-spherical track member, supporting standards, means for pivotally mounting said track member at directly opposite points to said supporting standards, and means whereby said track member may be rotated about its pivotal mounting through an arc of ninety degrees.

4. An amusement device comprising a semi-spherical track member, supporting standards, means for pivotally mounting said track member at directly opposite points to said supporting standards, said pivotal mounting being immovable as regards up and down movement, an arcuate rack attached to said member midway between its pivot supports, and a suitable gearing arranged to coöperate with said rack whereby the track member may be rotated about its pivotal mounting through an arc of ninety degrees.

In testimony whereof I affix my signature in presence of two witnesses.

OSCAR E. ADKINS.

Witnesses:
WALTER E. L. BOCK,
A. L. PHELPS.

Copies of this patent may be obtained for five cents each, by addressing the "Commissioner of Patents, Washington, D. C."